United States Patent
Lenz

(10) Patent No.: US 12,365,632 B2
(45) Date of Patent: Jul. 22, 2025

(54) SUPERABSORBENT POLYMER FILAMENT SIZING FOR CMC APPLICATIONS

(71) Applicant: Raytheon Technologies Corporation, Farmington, CT (US)

(72) Inventor: Brendan M. Lenz, Wethersfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 301 days.

(21) Appl. No.: 17/901,095

(22) Filed: Sep. 1, 2022

(65) Prior Publication Data

US 2023/0063554 A1  Mar. 2, 2023

Related U.S. Application Data

(60) Provisional application No. 63/240,045, filed on Sep. 2, 2021.

(51) Int. Cl.
*C08J 9/228* (2006.01)
*C04B 35/80* (2006.01)
*C08J 3/075* (2006.01)

(52) U.S. Cl.
CPC ............... *C04B 35/80* (2013.01); *C08J 9/228* (2013.01); *C04B 2237/365* (2013.01); *C08J 3/075* (2013.01); *C08J 2300/14* (2013.01)

(58) Field of Classification Search
CPC ...................................................... C08J 9/228
See application file for complete search history.

(56) References Cited

U.S. PATENT DOCUMENTS

| | | | |
|---|---|---|---|
| 5,392,500 A | 2/1995 | Olry et al. | |
| 5,534,304 A * | 7/1996 | Geursen | D06M 15/285 |
| | | | 427/389.9 |
| 6,228,786 B1 | 5/2001 | Olry et al. | |
| 10,829,872 B2 | 11/2020 | Wang et al. | |
| 2003/0138594 A1 | 7/2003 | Lobovsky et al. | |
| 2006/0081323 A1* | 4/2006 | Millard | C04B 35/18 |
| | | | 264/643 |
| 2017/0291853 A1* | 10/2017 | Harms | C04B 24/2652 |

FOREIGN PATENT DOCUMENTS

| | | |
|---|---|---|
| CN | 110818440 A | 2/2020 |
| KR | 20200005883 A | 1/2020 |

OTHER PUBLICATIONS

Extended European Search Report for EP Application No. 22193552.1, dated Feb. 7, 2023, 8 pages.

* cited by examiner

*Primary Examiner* — Andrew T Piziali
(74) *Attorney, Agent, or Firm* — Kinney & Lange, P.A.

(57) ABSTRACT

A method of preparing a ceramic fabric for use in a ceramic matrix composite includes arranging a plurality of ceramic tows, each comprising a plurality of filaments, introducing a superabsorbent polymer to the plurality of ceramic tows such that an amount of the superabsorbent polymer surrounds at least a subset of the plurality of filaments within each of the plurality of ceramic tows, and introducing water to the plurality of ceramic tows to cause the superabsorbent polymer to expand and force apart adjacent ones of the subset of the plurality of filaments within each of the plurality of ceramic tows. Expansion of the superabsorbent polymer within one of the plurality of ceramic tows reduces a filament packing density of the one of the plurality of ceramic tows.

14 Claims, 3 Drawing Sheets

SUPERABSORBENT POLYMER FILAMENT SIZING FOR CMC APPLICATIONS

CROSS-REFERENCE TO RELATED APPLICATION(S)

This application claims the benefit of U.S. Provisional Application No. 63/240,045 filed Sep. 2, 2021 for "SUPERABSORBENT POLYMER FILAMENT SIZING FOR CMC APPLICATIONS" by B. Lenz.

BACKGROUND

The present invention relates to ceramic matrix composites, and more particularly, to the preparation of woven ceramic fabrics and preforms for use in ceramic matrix composites.

In the processing of ceramic matrix composites (CMCs), there is a need to infiltrate matrix within and around tows within plies. In a woven CMC system, there are often large voids that exist between adjacent tows of a preform that can become large defects after matrix infiltration. Such defects diminish interlaminar properties of the composite structure. Techniques that disperse filaments within the tows can increase contact surface area between plies of the preform and provide more accessible surface area for infiltration.

SUMMARY

A method of preparing a ceramic fabric for use in a ceramic matrix composite includes arranging a plurality of ceramic tows, each comprising a plurality of filaments, introducing a superabsorbent polymer to the plurality of ceramic tows such that an amount of the superabsorbent polymer surrounds at least a subset of the plurality of filaments within each of the plurality of ceramic tows, and introducing water to the plurality of ceramic tows to cause the superabsorbent polymer to expand and force apart adjacent ones of the subset of the plurality of filaments within each of the plurality of ceramic tows. Expansion of the superabsorbent polymer within one of the plurality of ceramic tows reduces a filament packing density of the one of the plurality of ceramic tows.

A sheet of ceramic fabric for use in a ceramic matrix composite, the sheet being in an unexpanded state, includes a plurality of woven or braided ceramic tows and a superabsorbent polymer within the ceramic tows and surrounding at least a subset of filaments within the ceramic tows.

Figure 1:
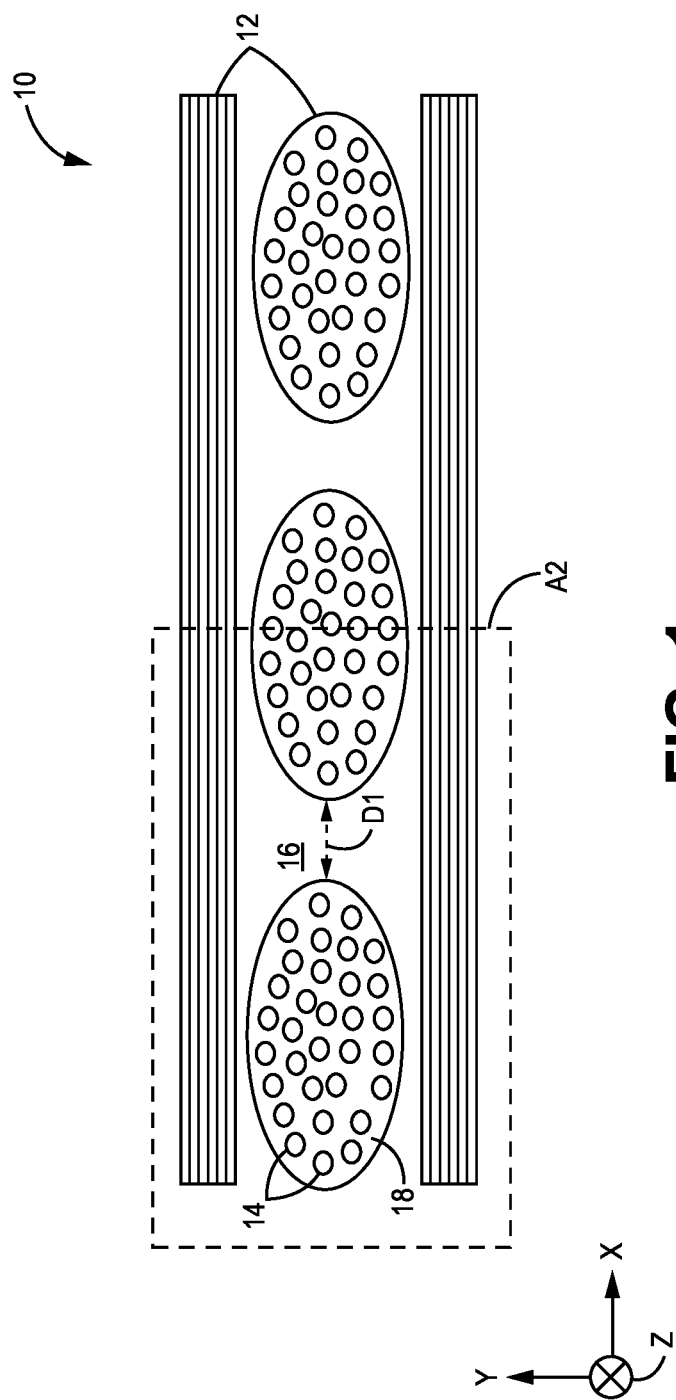
FIG. 1 is a simplified cross-sectional view of a ceramic fabric showing ceramic tows in a first, unexpanded state.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a method for altering the architecture of a ceramic fabric to create a more uniform pore distribution and enhance matrix formation. More specifically, a superabsorbent polymer (SAP) material can be incorporated into ceramic tows of a fabric to disperse the tow filaments when exposed to water. The SAP material can be subsequently removed to leave behind an architecture with dispersed filaments.

Figure 2:
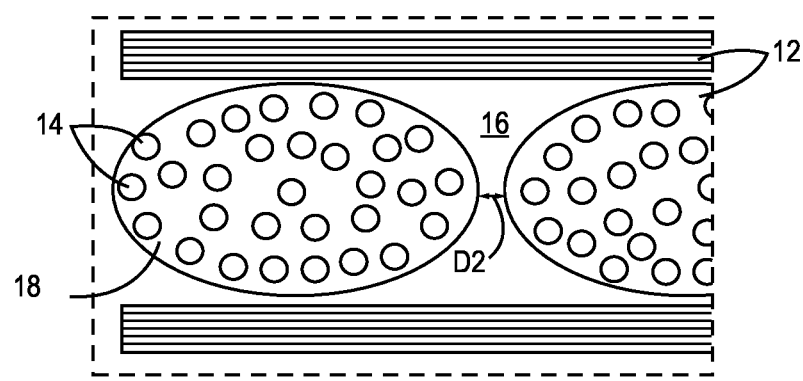
FIG. 2 is a close-up cross-sectional view of area A2 of FIG. 1, showing the ceramic tows in a second, expanded state.
Figure 3:
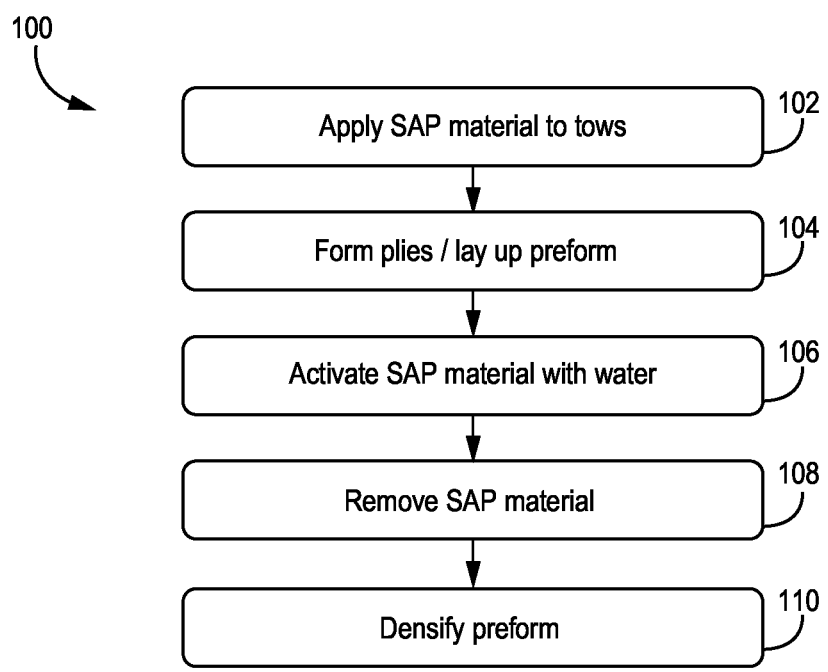
FIG. 3 is a flow chart illustrating steps of preparing the woven ceramic fabric for use in a ceramic matrix composite.

FIG. 1 is a simplified cross-sectional view of a portion of ceramic fabric sheet (or ply) 10 formed from fiber tows 12. Sheet 10 is shown in an unexpanded state. FIG. 2 is a close-up view of area A2 of FIG. 1 showing tows 12 of sheet (or ply) 10 in an expanded state. FIG. 3 is a flowchart illustrating selected steps of method 100, used to prepare a ceramic fabric sheet for use in a CMC. Steps 102-110 of method 100 are described below in combination with FIGS. 1 and 2. FIGS. 1-3 are described together.

Each tow 12 can be a bundle of roughly 500 silicon carbide filaments. Other suitable ceramic materials and/or filament counts are contemplated herein. As shown in FIG. 1, sheet 10 can have a woven architecture of perpendicularly disposed warp and weft tows 12. Suitable woven architectures can include plain, harness (e.g., 3, 5, 8, etc.), twill, braid, or non-symmetric to name a few non-limiting examples.

Sheet 10 can further include pores 16 which can generally be defined as inter-tow spaces in the woven architecture. This includes spaces between adjacent tows 12 disposed in the same direction (e.g., adjacent weft tows), as well as adjacent and differently disposed tows 12 (e.g., adjacent warp and weft tows). Pores 16 are identified between tows 12 disposed along the z-axis (into the page) in FIG. 1, but it should be understood that various other pores can be present which are not labeled and/or are out of plane in FIG. 1. Due to the shape of tows 12 and the woven architecture of sheet 10, dimensions of a pore 16 can vary along a particular direction (e.g., along the y-axis). Dimension D1 is shown as the nearest point between two adjacent tows 12, and can represent a portion of the area and volume of a particular pore 16, such as a diameter for a more rounded pore, or a width in a pore with straight sides. With respect to an individual tow 12, inter-filament spacing, or pores 18, can be defined by the packing density of filaments 14. Such packing density can, for example, be determined by the area covered by filaments 14 divided by the bounding area of a respective tow 12. Packing density within a respective tow 12 can range from 0.5 to 0.7 in an exemplary embodiment.

It can be desirable to reduce filament packing density in tows 12 to increase inter-filament spacing (i.e., pores 18) and decrease the size of pores 16 to create a more uniform distribution of pores 16 and 18 throughout sheet 10. Accordingly, at step 102, a SAP material can be applied to sheet 10/tows 12 in such a manner as to surround filaments 14 and occupy at least some of pores 18. Exemplary SAP materials can include hydrogels like sodium polyacrylate, potassium polyacrylate, polyacrylamides, a combination of polyvinyl acetate and polyacrylamides, and ammonia-based hydrogels, to name a few non-limiting examples. Thermally expanding foams can also be used. Such a material is generally characterized by its ability to absorb several hundred to a thousand times its weight in water.

In order to apply the SAP material to tows 12, tows 12 can already be in a woven state (i.e., sheet 10), or the SAP material can be applied to individual tows 12 before weaving. In either case, tows 12 are preferably desized by a prior heat treatment or other suitable process to remove their polymer coatings in order to enhance infiltration of the SAP material into tows 12, and the dispersal of filaments 14 when the SAP material expands in a later step. Detensioning of woven tows 12 may also be desirable for these reasons. For woven architectures, the SAP material can be applied by immersing the structure (i.e., sheet 10) in a bath containing the SAP material in solution. Other application methods such as spraying or painting can also be used. Individual tows 12 can also be immersed in the SAP solution, or the SAP material can be extruded onto a tow 12 as it is pulled across a series of rollers. In such a case, tows 12 with the SAP material are woven into a sheet 10. Individual tows 12 with SAP material can alternatively be incorporated into a more complex structure, such as a braided tube or sleeve which can also undergo the subsequent steps discussed below.

At step 104, and once the SAP material is sufficiently applied to tows 12, one or more sheets 10 can be formed into plies and arranged into a desired two or three dimensional preform structure. In many cases, the preform structure can be supported by one or more sets of rigid tooling, formed from materials such as plastic, steel, aluminum, and or graphite. The tooling can continue to support and maintain the shape of the preform structure through the matrix formation, discussed in greater detail below. In an alternative embodiment, step 104 can precede step 102 such that the SAP material can be applied to tows 12 after incorporation into a preform structure. In such an embodiment, application can be carried out, for example, by immersing the preform and accompanying tooling into a SAP solution bath.

At step 106, tows 12 within the preform structure can be hydrated to activate the SAP material. As used herein, the term activate means to cause the SAP material to expand, which can occur through exposure to/absorption of water. In a dry/unexpanded state, the long polymer chains of the SAP material are coiled. When the material begins to absorb water, the polymer chains uncoil and cause the network of chains to expand. The preform structure and tooling can be immersed in a water bath for an amount of time sufficient to cause the desired hydration and expansion of the SAP material, usually to the saturation point of the SAP material. Water can also be sprayed onto the preform structure. In both cases, the tooling helps to limit expansion of tows 12 caused by the expansion of the SAP material and dispersal of filaments 14. This allows the preform structure to maintain the desired geometry and prevents unwanted distortion/warping caused by unrestricted expansion.

FIG. 2 shows tows 12 of sheet (or ply) 10 in an expanded state. As such, filaments 14 have dispersed within the bundled arrangement of the tows 12 caused by the expansion of the SAP material. This creates larger inter-filament spacing (i.e., pores 18) and a reduced packing density within a respective tow 12. More specifically, the packing density of a respective tow 12 can be reduced by about 40% to 60%, for example, to 0.2 to 0.7. Additionally, as the dispersal of filaments causes tows 12 to expand toward adjacent filaments, the dimensions of pores 16 can be reduced. Dimension D2, measured at the same point (e.g., nearest point between adjacent filaments) as dimension D1, can be less than dimension D1 in some cases, by 50% to 80%.

At step 108, the hydrated SAP material can be removed (i.e., burned off) and water evaporated from the preform structure using heat. Heating can be carried out in a distinct step, or simultaneously with matrix formation (step 110), which exposes the preform to high temperatures. Matrix formation and densification can be carried out at step 110 using a chemical vapor infiltration or deposition (CVI or CVD) process. During densification, the plies are infiltrated by reactant vapors, and a gaseous precursor deposits on the fibers. The matrix material can be a silicon carbide or other suitable ceramic material. Densification is carried out until the resulting CMC has reached the desired residual porosity.

The resulting CMC formed with the woven fabric can be incorporated into aerospace, maritime, or industrial equipment, to name a few, non-limiting examples.

Discussion of Possible Embodiments

The following are non-exclusive descriptions of possible embodiments of the present invention.

A method of preparing a ceramic fabric for use in a ceramic matrix composite includes arranging a plurality of ceramic tows, each comprising a plurality of filaments, introducing a superabsorbent polymer to the plurality of ceramic tows such that an amount of the superabsorbent polymer surrounds at least a subset of the plurality of filaments within each of the plurality of ceramic tows, and introducing water to the plurality of ceramic tows to cause the superabsorbent polymer to expand and force apart adjacent ones of the subset of the plurality of filaments within each of the plurality of ceramic tows. Expansion of the superabsorbent polymer within one of the plurality of ceramic tows reduces a filament packing density of the one of the plurality of ceramic tows.

The method of the preceding paragraph can optionally include, additionally and/or alternatively, any one or more of the following features, configurations and/or additional components:

The above method can further include desizing the plurality of ceramic tows prior to arranging the plurality of ceramic tows.

In any of the above methods, introducing the superabsorbent polymer to the plurality of ceramic tows can include one of a spraying, extruding, and immersing technique.

In any of the above methods, arranging the plurality of ceramic tows can include one of weaving or braiding the plurality of ceramic tows to form a ceramic fabric sheet.

Any of the above methods can further include forming a plurality of plies from the ceramic fabric sheet prior to introducing water to the plurality of ceramic tows.

Any of the above methods can further include laying up the plurality of plies into a preform structure using tooling.

In any of the above methods, introducing water to the plurality of ceramic tows can include immersing the preform structure and tooling into a bath.

Any of the above methods can further include densifying the preform using one or a combination of a chemical vapor infiltration and chemical vapor deposition.

Any of the above methods can further include heating the preform structure prior to densifying the preform to burn off the superabsorbent polymer and remove the water.

In any of the above methods, the filament packing density of the one of the plurality of ceramic tows can be reduced by 40% to 60%.

In any of the above methods, expansion of the superabsorbent polymer within the plurality of tows can reduce a dimension of an inter-tow pore by 50% to 80%.

A sheet of ceramic fabric for use in a ceramic matrix composite, the sheet being in an unexpanded state, includes a plurality of woven or braided ceramic tows and a superabsorbent polymer within the ceramic tows and surrounding at least a subset of filaments within the ceramic tows.

The sheet of the preceding paragraph can optionally include, additionally and/or alternatively, any one or more of the following features, configurations and/or additional components:

In the above sheet, the plurality of filaments of the plurality of woven or braided ceramic tows can be formed from silicon carbide.

In any of the above sheets, the superabsorbent polymer can include a material selected from the group consisting of polyacrylamide, potassium polyacrylate, sodium polyacrylate, polyvinyl acetate, ammonia-based hydrogels, and combinations thereof.

In any of the above sheets, the superabsorbent polymer can include a thermally expanding foam material.

Any of the above sheets can further include a first filament packing density defined by an area occupied by filaments of a respective tow divided a bounding area of the respective tow.

Any of the above sheets can further include a plurality of inter-tow pores, each of the plurality of inter-tow pores partially defined by a first dimension.

A preform for use in a ceramic matrix composite, the preform being in a expanded state, can include the plurality of woven or braided ceramic tows as a plurality of plies formed from any of the above sheets.

The above preform can further include a second filament packing density defined by the area occupied by filaments of the respective tow divided the bounding area of the respective tow, the second filament packing density being less than the first filament packing density.

Any of the above preforms can further include a second dimension partially defining the plurality of inter-tow pores, the second dimension being less than the first dimension.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preparing a ceramic fabric for use in a ceramic matrix composite, the method comprising:
    arranging a plurality of ceramic tows, each of the plurality of ceramic tows comprising a plurality of filaments;
    introducing a superabsorbent polymer to the plurality of ceramic tows such that an amount of the superabsorbent polymer surrounds at least a subset of the plurality of filaments within each of the plurality of ceramic tows;
    introducing water to the plurality of ceramic tows to cause the superabsorbent polymer to expand and force apart adjacent ones of the subset of the plurality of filaments within each of the plurality of ceramic tows, wherein expansion of the superabsorbent polymer within each of the plurality of ceramic tows reduces a filament packing density of each of the plurality of ceramic tows; and
    heating the plurality of ceramic tows to remove the expanded superabsorbent polymer and the water to produce a plurality of ceramic tows with a dispersed filament architecture.

2. The method of claim 1 and further comprising: desizing the plurality of ceramic tows prior to arranging the plurality of ceramic tows.

3. The method of claim 1, wherein introducing the superabsorbent polymer to the plurality of ceramic tows comprises one of a spraying, extruding, and immersing technique.

4. The method of claim 1, wherein arranging the plurality of ceramic tows comprises one of weaving or braiding the plurality of ceramic tows to form a ceramic fabric sheet.

5. The method of claim 1 and further comprising: forming a plurality of plies from the ceramic fabric sheet prior to introducing water to the plurality of ceramic tows.

6. The method of claim 5 and further comprising: laying up the plurality of plies into a preform structure using tooling prior to introducing water to the plurality of ceramic tows.

7. The method of claim 6, wherein introducing water to the plurality of ceramic tows comprises immersing the preform structure and tooling into a bath.

8. The method of claim 6 and further comprising: densifying the preform using one or a combination of a chemical vapor infiltration and chemical vapor deposition.

9. The method of claim 8, wherein the step of heating the plurality of ceramic tows to remove the expanded superabsorbent polymer and the water is conducted prior to densifying the preform comprising the plurality of ceramic tows with a dispersed filament architecture.

10. The method of claim 1, wherein the filament packing density of the one of the plurality of ceramic tows is reduced by 40% to 60%.

11. The method of claim 1, wherein expansion of the superabsorbent polymer within the plurality of tows reduces a dimension of an inter-tow pore by 50% to 80%.

12. The method of claim 1, wherein the plurality of filaments of the plurality of ceramic tows are formed from silicon carbide.

13. The method of claim 1, wherein the superabsorbent polymer comprises a material selected from the group consisting of polyacrylamide, potassium polyacrylate, sodium polyacrylate, polyvinyl acetate, ammonia-based hydrogels, and combinations thereof.

14. The method of claim 1, wherein the superabsorbent polymer comprises a thermally expanding foam material.

* * * * *